Patented Apr. 20, 1937

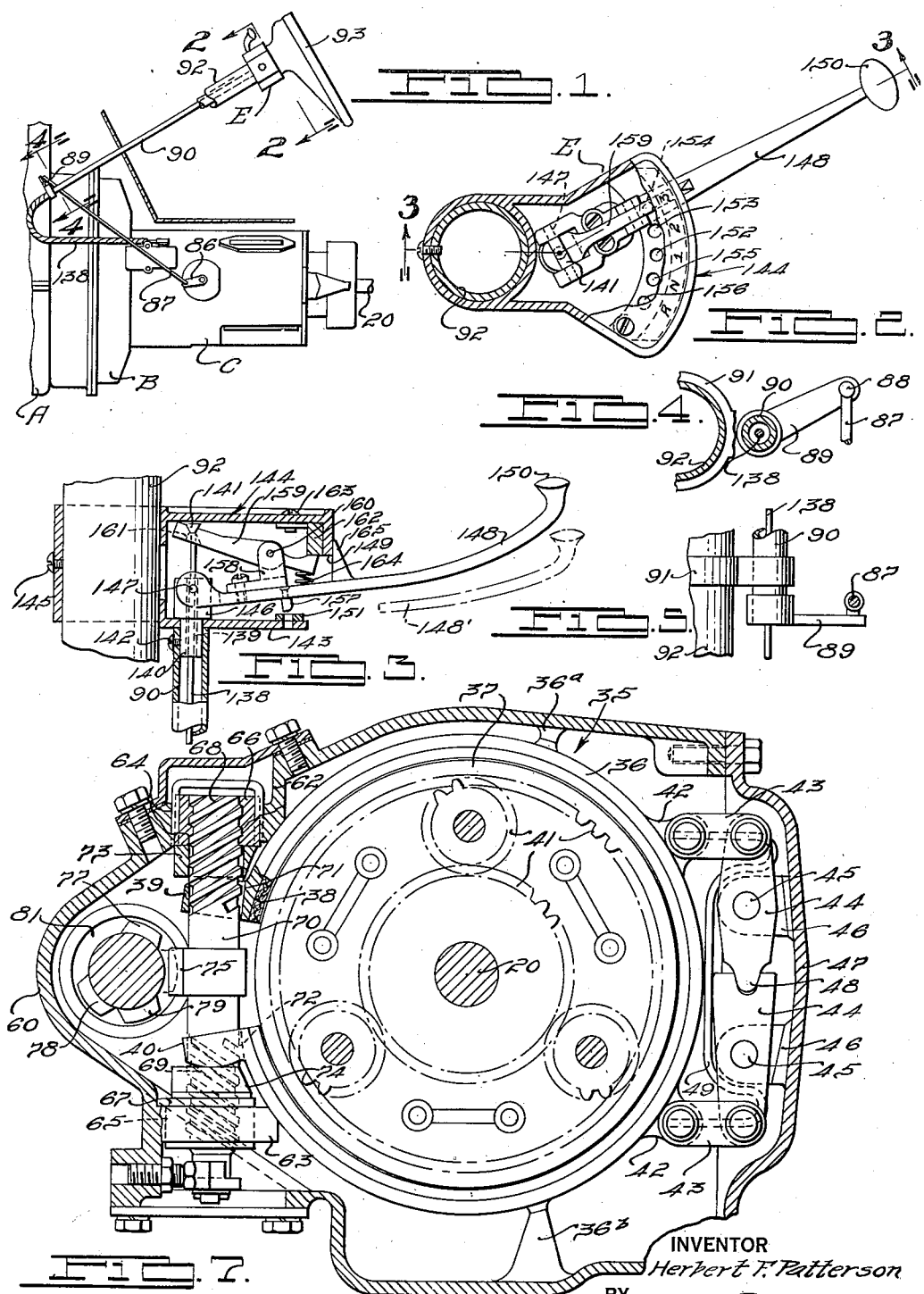

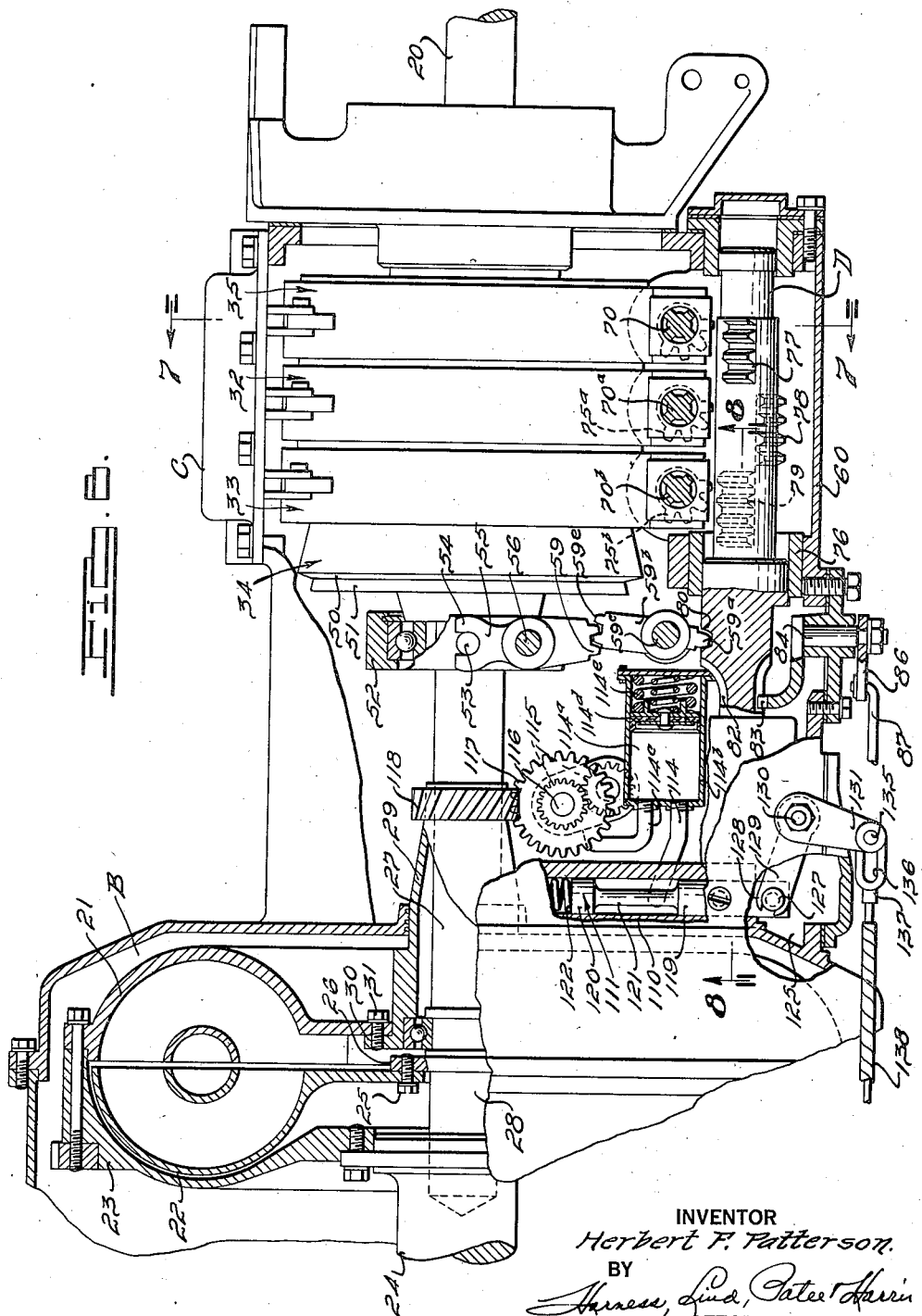

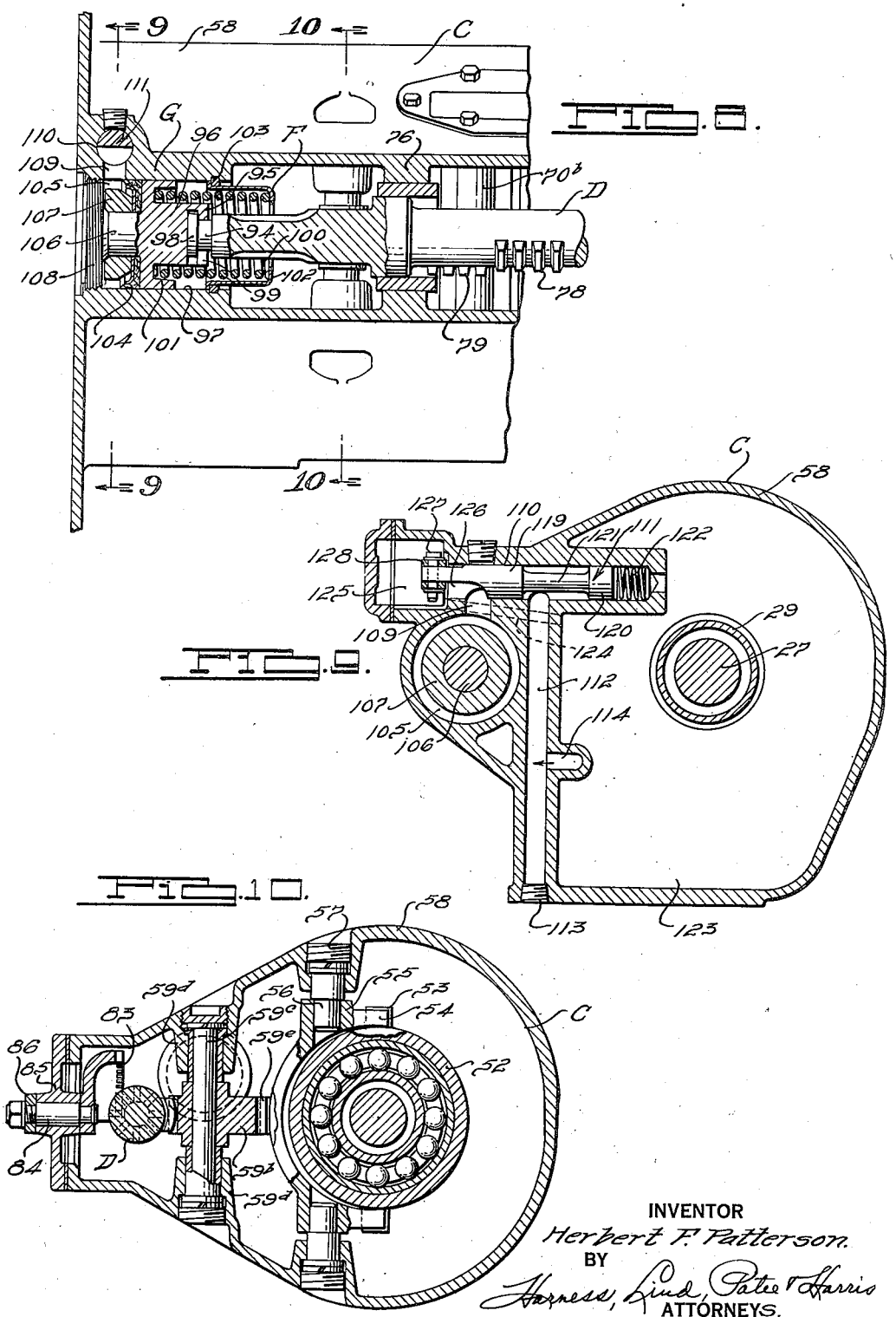

2,077,581

UNITED STATES PATENT OFFICE 2,077,581

POWER TRANSMISSION

Herbert F. Patterson, Detroit, Mich., assignor to Chrysler Corporation, Highland Park, Mich., a corporation of Delaware Application July 5, 1935, Serial No. 29,935

12 Claims. (Cl. 74—262)

This invention relates to power transmission devices and refers more particularly to improvements in power transmission devices or systems especially adapted for use in connection with motor vehicles, although not necessarily limited thereto.

My invention, in certain more limited aspects thereof, provides improvements in the drive and control for power transmission systems of the type including the well-known epicyclic or planetary transmission. With such planetary transmissions, it is customary to arrange the gearing to provide for the desired number of speed ratios between the engine and vehicle driving ground wheels and such gearing is customarily selected and controlled to obtain the desired speed ratio by actuation of any one of a group of transmission gearing controlling clutches usually consisting of reaction brake bands associated with and controlling the rotation of corresponding drums or similar elements of the various planetary gear trains.

One object of my invention resides in the provision of an improved actuating mechanism for obtaining the several speed ratios provided by the transmission or other speed changing mechanism, the latter preferably being of the planetary gear type although not necessarily limited thereto in the broader aspects of my invention.

A further object of my invention resides in the provision of improved actuating mechanism for manipulating the various gear trains of a transmission, particularly a planetary type of transmission, whereby means is provided responsive to manual control for automatically bringing about a gear ratio change with a minimum of time required, and with improved quietness and reduction of shock during the gear change.

In carrying out the above objects of my invention, I have provided a common actuator or prime mover which may be of the fluid pressure type for applying the necessary force to the braking devices in order to quickly and smoothly control the rotation of the desired drum of the planetary gearing, a selector mechanism being provided under manual control of the vehicle driver for selectively causing the common actuator to apply a braking force to the proper drum. This actuator may be of the fluid pressure type adapted for operation by oil pressure, air pressure either above or below atmospheric pressure, or other equivalent systems. I prefer, according to the teachings of this phase of my invention, to provide for energizing the actuator by oil pressure.

A planetary type of transmission presents a number of advantages over the more conventional sliding gear types of transmissions, and my invention is therefore primarily directed toward planetary types of transmission and power transmission systems employing planetary gear speed ratio controlling devices although, as aforesaid, the fundamental principles of my invention may, if desired, be employed in connection with transmissions of other types including the aforesaid sliding gear types of transmissions. By way of example in connection with the aforesaid advantages of the planetary transmission over more conventional types, it may be noted that the planetary transmission especially when used in conjunction with a fluid type of clutch between the engine and transmission permits gear changes without the necessity of releasing the heretofore conventional main clutch between the engine and transmission so as to obtain relatively quick gear changes and faster acceleration of the motor vehicle. This is made possible by reason of the fact that the braking devices associated with the planetary gear trains may quickly operate, the fluid clutch smoothing the shock of the gear change by reason of its inherent slipping qualities. By reason of my invention, these advantages of a fluid coupling are still further taken advantage of by effecting a fast operation of the gear change mechanism and by further reducing the shock in the mechanism.

Further objects and advantages of my invention will be apparent from the following detailed description of one illustrative embodiment of the principles of my invention, reference being had to the accompanying drawings, in which:

Fig. 1 is a side elevational view somewhat diagrammatic in form illustrating my power transmission mechanism as a whole.

Fig. 2 is a detail sectional view along the line 2—2 of Fig. 1 showing the manually controlled selector mechanism.

Fig. 3 is a sectional view of the Fig. 2 mechanism taken along line 3—3 of Fig. 2.

Fig. 4 is a detail sectional plan view along the line 4—4 of Fig. 1 showing the steering post mounting for certain of the selector operating connections.

Fig. 5 is a side elevational view of the parts shown in Fig. 4.

Fig. 6 is an enlarged top plan view of the transmission and fluid clutch with parts thereof broken away to show the operating structure.

Fig. 7 is a sectional elevational view through the transmission illustrating one of the speed ratio controlling devices and parts associated therewith, the section being taken along the line 7—7 of Fig. 6.

Fig. 8 is a sectional side elevational view of the selector rack shaft operating mechanism taken along the line 8—8 of Fig. 6.

Fig. 9 is a sectional view along the line 9—9 of Fig. 8 showing the fluid pressure control valve.

Fig. 10 is a sectional view along line 10—10 of Fig. 8 illustrating the selector rack operating means for the direct speed ratio controlling device.

Referring to the drawings, I have illustrated my invention in connection with a motor vehicle drive, which is described and claimed in the co-pending application of Carl A. Neracher and Teno Iavelli, Serial No. 752,948, filed November 14, 1934. This drive includes a prime mover or engine A, a portion of which is shown in Fig. 1, a main clutch B driven from the engine and a change speed transmission or gear box C driven from the clutch B. The drive passes from the transmission through a power take-off shaft 20 which, as usual, may extend rearwardly of the vehicle to drive the usual ground wheels (not shown).

The clutch B may be of any suitable construction for controlling the drive between engine A and transmission C, this clutch being illustrated in Figs. 1 and 6 in the form of a fluid coupling type having the usual driving and driven cooperating vane members 21 and 22, respectively. The driving vane member 21 is carried by the engine flywheel 23, the latter being connected as usual with the rear end of the engine crankshaft 24. The driven vane member 22 is connected at 25 to a flange 26 of the driven shaft 27, this shaft having a forward extension 28 piloted in the rear end of the crankshaft 24. The driven shaft 27 extends rearwardly to drive the power take-off shaft 20 through the intermediary of the various gear trains of transmission C.

Where the power means for operating the transmission is afforded by a fluid such as oil under pressure, the pump for placing the oil under pressure is preferably operated from the engine to maintain the fluid pressure even when the engine is idling. It is, therefore, preferred to provide a pump drive from the driving clutch member 21 rather than the driven clutch member 22, inasmuch as the latter may be stationary under certain conditions of vehicle operation such as when the vehicle is standing still with the engine idling.

This drive may be provided by reason of a driving sleeve or hollow shaft 29 mounted on the shaft 27 but rotatable independently thereof. The sleeve 29 has a hub or flange 30 connected at 31 with the driving vane member 21 of the clutch B so that even when the driven vane member 22 is not being operated from the driving member 21, the sleeve 29 will be rotatably driven from the engine crankshaft 24 and flywheel 23. The pump drive from sleeve 29 will be more apparent hereinafter.

I have illustrated a fluid type of clutch B since a clutch of this character has a number of advantages in connection with a transmission of the planetary gear type C. Thus, the fluid type of clutch is desirable in providing a smooth drive for the vehicle through the planetary transmission, relatively high power driving efficiency, automatic release of the drive between the engine and transmission when the engine is idling and with the transmission manipulated to establish one of its driving gear ratio settings, and other well-known favorable characteristics. I desire to point out that other types of clutches may be employed to control the drive between engine A and transmission C if desired. For example, the well-known type of friction clutch may be employed and may be manually operated or automatically operated by the well-known commercial type of vacuum clutch releasing mechanism as will be readily understood.

I have illustrated the change speed transmission C as the epicyclic or planetary type, this general form of transmission being well-known in the art and, as usual, includes a plurality of transmission speed ratio controlling clutches or brakes 32, 33, 34 and 35, these braking devices being respectively adapted to actuate the transmission in its first speed ratio or low gear, second speed ratio or intermediate gear, third speed ratio or direct drive, and reverse drive.

The typical brake device 35 illustrated in Fig. 7 consists of an outer band 36 which substantially surrounds the drum 37, the band being provided with friction braking material 38 carried by the band and adapted for frictional engagement with drum 37. The band 36 has its ends formed with laterally projecting actuating flanges 39 and 40 positioned adjacent each other, means being provided to move the band ends toward each other to contract the band 36 for causing the friction material 38 to brake rotary drum 37, the band having sufficient inherent resilience to expand away from contact with the drum when the actuating means is relieved at the flanged ends 39 and 40. In Fig. 7 the reverse speed ratio braking device 35 is illustrated in its inoperative position whereby the drum 37 is free to rotate through operation of the planetary gear set 41 somewhat diagrammatically illustrated in association with the drum 37. When the braking device 35 is actuated by contracting the band 36, the drum 37 is held against rotation, the driven shaft 20 in such instance being operated through the planetary gearing 41 to provide the reverse drive for the motor vehicle.

In order to anchor the band 36 and to substantially equalize the braking forces applied to drum 37 around the periphery thereof to substantially avoid a tendency toward lateral loading of the drum and planetary gearing transverse to the axis of the drum, I have provided the band with a circumferentially spaced pair of anchoring flanges 42. The flanges 42 are connected through links 43 with the levers 44 pivotally mounted at 45 with the supporting brackets 46 of the transmission side cover casing 47, the levers 44 being interlocked at 48 so that movement of one of the flanges 42 will be transmitted through the pivotal levers 44 and the links 43 to the other portion of the band associated with the anchoring device. The links 43 are thus pivotally connected at their opposite ends respectively with the anchors 42 and levers 44. In order to maintain a yielding tension in the links and levers to prevent their rattling and also to exert a yielding expanding action on band 36, I have provided a ribbon-like spring 49 which passes over the brackets 46 and which has its opposite end anchored to the pivots at the opposite ends of the links 43.

In order to support the brake band assembly as a whole and to limit outward expansion of the brake band, I have provided the lugs or stops 36ᵃ, 36ᵇ which project inwardly of the transmission casing as shown in Fig. 7.

The third speed clutching device 34 is arranged for a direct drive through the transmission and differs somewhat from the braking devices 32, 33 and 35 in that the clutching device 34 has its rotary drum or element 50 of the cone type adapted for clutching or braking action by fractional engagement with an axially movable cone clutch member 51. This cone member 51 is adjustable by a collar 52 having pins 53 engaged by the yoked end 54 of an actuating lever 55 pivotally mounted by pins 56 (see Figs. 6 and 10) secured by fasteners 57 to the transmission transverse housing or casing 58. The opposite end of lever 55 is formed with gear teeth 59, the purpose of which will presently be more apparent.

The side 60 of the transmission casing is provided with the vertically spaced inwardly extending supporting brackets 62 and 63, these brackets being formed with coaxial openings 64, 65 respectively. Splined within the openings 64, 65 are the nuts 66, 67 and these in turn are axially and oppositely threaded to receive the threaded ends 68 and 69 of an operating oscillatory shaft or screw 70.

The shaft 70 extends through openings 71, 72 respectively formed in the band flanges 39, 40, these openings preferably having considerable clearance with shaft 70 so as not to bind on the shaft when the band is contracted and expanded. In order to transmit the thrust of the nuts 62, 63 to the flanges 39, 40, the intermediate washers 73, 74 are provided, these washers having lower flat faces engaging the rounded edges of the respective openings 71, 72 so as to facilitate the operation of the band movement and relieve distorting loads at the threaded portions of shaft 70 during the operation of the band.

The operating shaft 70 of the reverse braking device 35 has its portion thereof intermediate the band ends 39 and 40 formed with an arcuate portion of a gear, the gear teeth being designated at 75, the means for oscillating the shaft 70 through the teeth 75 being more particularly hereinafter described.

In operation of the reverse speed controlling device or brake 35 as thus far described, it will be apparent that when the shaft 70 is given a rotary movement, such movement operates through the oppositely threaded ends of the shaft to cause the nuts 66 and 67 to move inwardly toward each other in their splined openings 64 and 65 respectively, this movement acting through washers 73 and 74 to contract the band ends 39 and 40 whereby the reverse drum 37 has its rotation checked for establishing the reverse drive through the transmission. When the shaft 70 is rotated in the opposite direction the nuts 66 and 67 are moved away from each other and the band 36 is expanded to permit the drum 37 to again rotate and thereby relieve the drive through the transmission controlling device 35.

In order to avoid repetition, I have not illustrated all of the details of the brake operating means associated with the controlling devices 32, 33, it being understood that this operating means is similar to that described in connection with the controlling device 35. For convenience of reference the operating shaft or screw for the first speed braking device is designated as 70$^a$ and the corresponding shaft for the second speed braking device 33 is designated as 70$^b$ as best shown in Fig. 6.

The segmental gear teeth associated with these shafts is respectively designated as 75$^a$ and 75$^b$. As will be more apparent presently the teeth 75, 75$^a$, 75$^b$ and 59 are adapted to be selectively operated in order to selectively control the engagement and release of the respective speed ratio controlling devices 35, 32, 33 and 34.

I will next describe the common operating means or actuating element which is adapted for selective engagement under manual control with the aforesaid gear segments 75, 75$^a$, 75$^b$ and 59 for respectively operating the speed ratio controlling devices 35, 32, 33 and 34 and also for establishing a neutral condition in the transmission. In the case of the third speed gear segment 59, the actuating element actually engages the single tooth segment 59$^a$ carried by a lever 59$^b$ pivotally supported (see Fig. 10) by a pin or shaft 59$^c$ journalled in bearings 59$^d$ carried by the casing 58. The inner end of lever 59$^b$ has a toothed segment 59$^e$ always meshing with the segment 59.

Referring now particularly to Figs. 6 and 8, the transmission side casing 60 is provided with a plurality of suitable bearings, one of which is shown at 76, for receiving the reciprocating and oscillating rack or actuating shaft D.

This actuating shaft D has a series of teeth forming a rack adapted to be brought into operative association with each of the gear segments, these racks being designated at 77, 78, 79 and 80. From Fig. 6 it will be noted that the racks are longitudinally spaced along the shaft D and that they are also spaced circumferentially of the shaft whereby upon progressive rotation of the shaft only one of the racks will engage its associated gear segment at any time. In Figs. 6 and 10 it will be noted that the shaft D is positioned so that the third speed rack 80 is in position for operating the third speed gear segment 59$^a$ and when the shaft D is moved to the right as viewed in Fig. 6 the lever 55 will be rocked by the intermediate lever 59$^b$ on its pivot 56 to move the third speed clutch part 51 into engagement with the drum 50 and cause the drive to take place through the transmission in the third gear ratio or direct drive. It will furthermore be noted that with the third speed rack 80 in the position illustrated, the remaining racks 77, 78 and 79 are free from engagement with their respective associated gear segments 75, 75$^a$ and 75$^b$. From Fig. 7 it will be noted that the shaft D has a space 81 longitudinally between the reverse rack 77 and the first speed rack 78, this space being designated as the neutral space so that when the shaft is positioned with the space 81 facing the gear segments (when shaft D is rotated approximately 180° from the position illustrated in Fig. 7) each of the racks will be free from contact with its associated gear segment and the transmission will be in neutral at which time the various braking devices 32, 33, 34 and 35 are released.

In order to selectively rotate the shaft D for selectively engaging the racks thereof with the respective gear segments and also for axially operating the shaft in the various positions of selective adjustment, the following mechanism is provided.

Forwardly adjacent the third speed rack 80, the rack D is provided with a circular rack or gear 82 meshing with the segmental rack 83 rotatable with a shaft 84 journalled in the casing member 85. The shaft 84 has fixed thereto, outwardly of the transmission casing, a lever 86 pivotally engaged by a rod 87 which, as best shown in Fig. 1, extends forwardly for pivotal connection at 88 with a lever 89 secured to a tubular shaft 90 which is rotatably journalled at its lower end by a support bracket 91 (see Figs. 4 and 5) suitably attached to the usual post 92 for the vehicle steering wheel 93. The hollow shaft 90 (see Figs. 2 and 3) extends upwardly adjacent the steering post to the manually controlled device E for selectively controlling or manipulating the transmission speed ratios as will be presently more apparent.

Returning now to Fig. 8, the selector rack shaft D extends forwardly of the circular rack 82 and has an annular groove 94 adapted to receive the flange 95 of the fluid pressure operating piston 96 which reciprocates in the cylinder 97 formed in the casing. The piston 96 provides the actuating member of the power operating means G for moving shaft D under power to engage the brake bands. The rack shaft groove 94 provides the terminal shoulder 98 for shaft D, the piston flange 95 being open at 99 whereby the piston 96 may be readily attached to rack shaft D for movement as a unit therewith.

For yieldingly urging the rack shaft D to the left or forwardly to release the speed ratio controlling devices, I have provided prime mover means F preferably in the form of a compression coil spring 100 surrounding the forward end of rack shaft D and acting on piston 96 at the spring receiving annular recess 101 formed in the piston. The spring 100 has a fixed abutment provided by the abutment cup 102 anchored to the cylinder 97 by a spring ring 103.

The piston 96 has the flexible sealing cup 104 adapted to seal the piston against escape of the fluid rearwardly of the cylinder 97, the cup 104 bearing against the walls of the cylinder under the action of the fluid pressure introduced to the pressure chamber 105. The cup 104 is held in place by the forwardly extending piston shank 106 and the cup retaining member 107 carried thereby, the forward end of the cylinder being closed by a plug 108. Fluid, such as oil, under pressure is introduced to the pressure chamber 105 through a passage 109 leading to the valve controlled chamber or cylinder 110 which slidably receives the fluid pressure supply controlling valve 111. The cylinder 110 is supplied with oil under pressure through a passage 112 closed at one end by a plug 113 and receiving oil by a conduit 114 leading (see Fig. 6) to the chamber 114$^a$ of the accumulator cylinder 114$^b$ and thence by conduit 114$^c$ to the delivery side of a suitable pump 115, herein illustrated as a well-known gear type pump. The pump is driven from its location in the oil storing sump of the transmission casing by the vertical shaft 116 having a gear 117 driven by a gear 118 fixed to the aforesaid driving sleeve or hub 29 of the fluid impeller 21.

The valve 111 has outer and inner cylinder bearing portions 119 and 120 respectively and an intermediate reduced portion 121 always in communication with the supply passage 112. A spring 122 yieldingly urges valve 121 outwardly tending to establish communication between supply and delivery passages 112 and 109. In the drawings, the parts are shown in their positions for operating the third or direct speed controlling device 34, the fluid pressure being cut off from chamber 105 by the valve portion 119 lying between passages 112 and 109 as shown in Fig. 9. When valve 111 moves outwardly under manual control by action of spring 122, the reduced valve portion 121 affords communication between passages 112 and 109 to supply fluid pressure from accumulator 114$^b$ and pump 115 to operate piston 96 and selector rack shaft D rearwardly for actuating one of the speed ratio controlling devices 32, 33, 34 or 35 depending on the rotative selective adjustment of selector rack shaft D as will be presently more apparent. With the valve 111 in the position of cut-off illustrated in Fig. 9, the pressure chamber 105 is vented to the oil sump, generally indicated at 123 in Fig. 9, by a passage 124 opening outwardly to a chamber 125 which in turn is open to cylinder 110, the valve having a cut away portion 126 which, in such position, affords communication between passage 109 and chamber 125. It will be understood that when valve 111 is moved outwardly, releasing spring 122, to its fluid pressure supply position, the valve portion 119 closes communication between passage 109 and chamber 125.

The function and operation of the manually controlled selector mechanism E in relation to the selector rack shaft rotating means 83 and the rack reciprocating means G and F may now be further described.

Pivotally attached to the outer end of valve 111 by a pin 127 is the forked end 128 of a lever 129 (see Fig. 6) which is fixed to a pivot shaft 130, the shaft having also fixed thereto intermediate its ends a lever 131. Slidably engaging pin 135, which is carried by the end of lever 131, is the slot 136 of the end member 137 connected to Bowden wire mechanism 138. When wire 138 is moved rearwardly from the Fig. 6 position it will be apparent that spring 122 will act on valve 111 to move the latter outwardly, levers 129 and 131 swinging counterclockwise as far as permitted by the movement of slot 136.

The Bowden wire 138 (see Figs. 1–5) extends forwardly and upwardly through the hollow shaft 90 and through the axial passage 139 of the support member 140, the wire having an enlarged upper end 141. The member 140 is fixed to shaft 90 at 142 and passes through the bottom wall or floor 143 of the hollow casing 144, the latter encircling the steering post 92 for support and being attached thereto as at 145. The member 140 has a casing portion 146 shouldered to seat on floor 143, the upper end of shaft 90 bearing on the outer face of floor 143. The portion 146 has laterally projecting pins 147 pivoting the inner forked end of a selector arm or lever 148 which projects outwardly through the casing opening 149 to provide a hand grasping end 150 within convenient reach of the operator.

The floor 143 carries an arcuate strip 151 having a series of holes 152, 153, 154, 155 and 156 adapted to selectively receive the downwardly extending lever finger 157 whereby lever 148 may be selectively positioned for first speed, second, direct, neutral and reverse. In Fig. 2 these speed positions are abbreviated as 1, 2, 3, N and R.

Mounted on lever 148 by a bracket 158 is a lever 159 pivoted at 160 to the bracket and adapted for movement with and relative to the selector arm 148 within casing 144. The inner end of lever 159 has an opening 161 through which the Bowden wire 138 projects, the aforesaid enlarged end 141 seating on the upper face of lever 159. The outer end of lever 159 slidably bears against the under arcuate face of an abutment member 162 secured at 163 to casing 144, a spring 164 acting between levers 148 and 159 tending to separate these levers at the spring seats thereon. Lever 148 has a pointer 165 cooperating with the aforesaid speed indicating markings on the casing to readily advise the operator of the desired registration of finger 157 with the holes of strip 151.

In operation of the selector mechanism E, for changing the transmission speed ratio, the operator first lifts lever 148 to disengage finger 157 from one of the holes of plate 151, the outer end of lever 159 striking abutment 162 causing lever 159 to swing about pivot 160 compressing spring 164 and pulling Bowden wire 138 upwardly at the end 141 thereof. This position of parts is illustrated in Fig. 3, lever 148 having moved from the dotted line position 148'. When wire 138 is thus pulled, levers 131 and 129 (see Fig. 6) are swung clockwise, moving valve 111 inwardly to compress spring 122 (see Fig. 9) and vent chamber 105. At such time the spring 100 moves selector rack shaft D forwardly releasing whichever one of the speed ratio controlling devices was in operation prior to lifting the selector arm 149. It will be understood that if the selector arm was engaged with the neutral hole 155 prior to the aforesaid lifting operation, then the selector rack shaft D will move forwardly without operating during such movement to release any of the controlling devices 32 to 35, such devices having been already released in such instance.

After lifting arm 148 to the Fig. 3 position the operator may now release the lever to again restore the previous setting although ordinarily when arm 148 is lifted a new condition of setting of the transmission is desired. Therefore, while holding the arm 148 raised, the operator then swings the arm to the desired new setting. Assuming for illustration that direct speed is now desired, the operator swings lever 148 to align the indicator 165 with "3" and then releases the arm to engage finger 157 with the third speed hole 154. In order to illustrate a typical condition, the drawings show the parts just prior to release of arm 148 for obtaining this direct drive.

When arm 148 is swung as aforesaid, the arm pivots about the axis of shaft 90 and member 140, rotating shaft 90. Rotation of this shaft operates through link 87 and segment 83 to rotate the selector rack D relative to piston 96 to bring the third speed rack into mesh with tooth 59$^a$ of the operating mechanism for the clutch 51. It might be stated more clearly at this point that if any other setting of arm 148 had been made, the corresponding rack 77, 78, or 79 would have been meshed with the corresponding segmental gears 75, 75$^a$ or 75$^b$ but only one at a time. Likewise if neutral had been selected all segmental gears including the third speed tooth 59$^a$ would be free of the selector rack teeth, space 81 (see Fig. 7) being presented toward the segmental gears whereby rearward movement of the rack under fluid pressure operation would not actuate any of the speed ratio controlling devices.

Returning now to the aforesaid illustrative operation and with arm 148 swung to the third speed position, the operator now releases the arm under the influence of spring 164 whereby the valve spring 122 moves valve 111 outwardly operating through levers 129 and 131 to pull Bowden wire end 141 downward, the inner end of lever 159 resting on the top of member portion 146 (see Fig. 3). Outward movement of valve 111 admits fluid pressure from the accumulator chamber 114$^a$ and pump 115 to act on piston 96 to move the selector rack shaft D rearward and engage the clutch 51 of the third speed device 34. The motor vehicle is now driven in third speed, the fluid clutch B smoothly adjusting the engine A to the new driving conditions without shock or jolt, such action being facilitated by the accumulator chamber which will now be described.

The accumulator chamber, which especially characterizes my present invention, slidably receives a piston 114$^d$ normally urged toward the conduits 114 and 114$^c$ by a spring 114$^e$. This spring has sufficient strength so that it will not be fully compressed until the fluid pressure delivered from pump 115 to chamber 114$^a$ is approximately that desired for the operation of rack shaft D, say 200 to 500 pounds per square inch by way of example. Other mechanisms may, of course, require more or less pressure depending on the torque dealt with, the type of mechanism, and other factors.

During operation of the mechanism, the pump 115 will quickly fill the accumulator chamber 114$^a$ with fluid at the desired pressure, any excess fluid delivered by the pump being relieved by a suitable check valve (not shown) customarily associated with the delivery side of fluid pumps, or by other suitable pumping control systems.

At such time as the valve 111 is operated to establish communication between chamber 114$^a$ and the piston chamber 105 to effect actuation of shaft D, the spring 114$^e$ and the volume of fluid under pressure in chamber 114$^a$ act to quickly fill the chamber 105 at the required pressure and to compensate for the enlargement of chamber 105 as piston 96 moves rearwardly. Such piston movement would ordinarily be accompanied by a rapid falling off of the fluid pressure delivered by the pump but with my improvements this pressure is substantially maintained during movement of piston 96 so that the time required to effect operation of shaft D is considerably reduced.

Thus, with my improvements, the changes in speed ratios may be produced quicker and the vehicle actually starts driving quicker than heretofore under a new selected speed ratio. Furthermore, it is possible to employ a pump of less size and capacity with resulting economy in cost and loss of power for driving the pump.

The fluid pressure accumulator chamber 114$^a$ is also of particular advantage in changing speeds under open throttle conditions of vehicle drive where the brake bands will at least partially grip their respective drums. Under such conditions, the rapid rotation of the drums in conjunction with the oil film between the drums and their associated brake bands will result in some slippage at the instant that shaft D moves rearwardly by the fluid pressure. The pump 115 rapidly produces sufficient pressure to cause the band selected to firmly grip its drum but the slight slippage affords a smoother speed change with a minimum of shock to the mechanism and passengers. The accumulator chamber 114$^a$ and spring 114$^e$ are therefore preferably arranged so that, under the aforesaid conditions of open throttle gear ratio changes, the initial slip is not too great (as it would be but for the accumulator) but just enough to provide the aforesaid advantages. This initial slip is, of course, a matter of a fraction of a second but is important in providing the effect of smoothness of operation. The fluid coupling B, will of course further assist in smoothing the change speed operations.

Where speed changes are made at substantially closed throttle conditions, which are normal, the accumulator chamber and associated parts function to provide very rapid gear changes without material slippage at the bands of the character referred to under conditions of open throttle gear changes.

The motor vehicle may be driven in direct as long as desired, reverting again to the foregoing illustrative condition, the fluid pressure on piston 96 maintaining the selector rack shaft D rearward against the compression of spring 100.

When a new gear ratio is desired the operator merely lifts arm 148 to release the third speed device 34 by reason of the release of fluid pressure on piston 96 whereby selector rack shaft D moves forwardly by spring power, the arm 148 being swung to a new position to selectively rotatably adjust the selector rack shaft D. When arm 148 is released, the pressure is restored to operate the selector rack shaft D and the newly selected speed ratio controlling device or else a neutral condition of no drive.

Various modifications and changes will be apparent from the teachings of my invention, as set forth in the appended claims, and it is not my intention to limit my invention to the particular details of construction and operation shown and described for illustrative purposes.

What I claim is:

1. In a motor vehicle planetary transmission having a plurality of speed ratio controlling braking devices, fluid pressure operated means including a fluid pressure operated motor for selectively operating said devices, said fluid pressure operated means further including a common operating member adapted to transmit braking force from said motor selectively to said braking devices, manually operated means for controlling the selective operation of said fluid pressure operated means, means for supplying fluid under pressure to said motor, and means for supplementing the supply of fluid under pressure to said motor for opposing tendency of a drop in the pressure of said fluid during operation of said motor.

2. In a motor vehicle transmission having a plurality of speed ratio controlling devices, fluid pressure operated means including a fluid pressure operated motor for selectively operating said devices, said fluid pressure operated means further including a common operating member operably connected to said motor for selectively operating said controlling devices, manually operated means for controlling the selective operation of said fluid pressure operated means, means for supplying fluid under pressure to said motor, an accumulator chamber in said fluid supply, a piston in said chamber, and a spring acting on said piston for urging displacement of fluid in said accumulator chamber for opposing tendency of a drop in the pressure of said fluid during operation of said motor.

3. In a motor vehicle planetary transmission having a plurality of brake operated speed ratio planetary gear sets, means including an adjustable selector operating member adapted to selectively operate said brakes, power applying means for operating said member, manually controlled means for selectively adjusting said member and for controlling operation thereof by said power applying means, and means operating in response to said manually controlled means for supplementing the operation of said brakes by said power applying means.

4. In a motor vehicle planetary transmission having a plurality of brake operated speed ratio planetary gear sets, means including an adjustable selector operating member adapted to selectively operate said brakes, fluid pressure operating means for operating said member, a pump delivering fluid under pressure to said fluid pressure operating means, manually controlled means for selectively adjusting said member and for controlling operation thereof by said fluid pressure operating means, and means operating in response to said manually controlled means for supplementing the delivery of fluid under pressure to said fluid pressure operating means.

5. In a motor vehicle planetary transmission having a plurality of brake operated speed ratio planetary gear sets, means including an adjustable selector operating member adapted to selectively operate said brakes, fluid pressure operating means for operating said member, a pump delivering fluid under pressure to said fluid pressure operating means, manually controlled means for selectively adjusting said member and for controlling operation thereof by said fluid pressure operating means, an accumulator chamber communicating with the pump delivery and with said fluid pressure operating means, a piston operating in said chamber, and a spring acting on said piston for supplementing the delivery of fluid under pressure from said accumulator chamber to said fluid pressure operating means.

6. In a motor vehicle planetary transmission having a plurality of brake operated speed ratio planetary gear sets, means including an adjustable selector operating rack shaft adapted to selectively operate said brakes, power applying means for operating said rack shaft, manually controlled means for selectively adjusting said rack shaft and for controlling operation thereof by said power applying means, and means operating in response to said manually controlled means for supplementing operation of said rack shaft by said power applying means.

7. In a motor vehicle planetary transmission having a plurality of brake operated speed ratio planetary gear sets, means including an adjustable selector operating rack shaft adapted to selectively operate said brakes, fluid pressure operating means for operating said rack shaft, a pump delivering fluid under pressure to said fluid pressure operating means, manually controlled means for selectively adjusting said rack shaft and for controlling operation thereof by said fluid pressure operating means, and means operating in response to said manually controlled means for supplementing the delivery of fluid under pressure to said fluid pressure operating means.

8. In a motor vehicle planetary transmission having a plurality of brake operated speed ratio planetary gear sets, means including an adjustable selector operating rack shaft adapted to selectively operate said brakes, fluid pressure operating means for operating said rack shaft, a pump delivering fluid under pressure to said fluid pressure operating means, manually controlled means for selectively adjusting said rack shaft and for controlling operation thereof by said fluid pressure operating means, an accumulator chamber communicating with the pump delivery and with said fluid pressure operating means, a piston operating in said chamber and a spring acting on said piston for supplementing the delivery of fluid under pressure from said accumulator chamber to said fluid pressure operating means.

9. In a motor vehicle planetary transmission having a plurality of brake operated speed ratio planetary gear sets, means including an adjustable selector operating member adapted to selectively operate said brakes, fluid pressure operating means for operating said member, a pump delivering fluid under pressure to said fluid pressure operating means, manually controlled means for selectively adjusting said member and for controlling operation thereof by said fluid pressure operating means, and means operating in response to said manually controlled means for supplementing the delivery of fluid under pressure to said fluid pressure operating means, said manually controlled means including a valve operating to control the supply of fluid under pressure from said pump and supplemental delivery means to said fluid pressure operating means.

10. In a motor vehicle planetary transmission having a plurality of brake operated speed ratio planetary gear sets, means including an adjustable selector operating member adapted to selectively operate said brakes, fluid pressure operating means for operating said member, a pump delivering fluid under pressure to said fluid pressure operating means, manually controlled means for selectively adjusting said member and for controlling operation thereof by said fluid pressure operating means, an accumulator chamber communicating with the pump delivery and with said fluid pressure operating means, a piston operating in said chamber, and a spring acting on said piston for supplementing the delivery of fluid under pressure from said accumulator chamber to said fluid pressure operating means, said manually controlled means including a valve operating to control the supply of fluid under pressure from said pump and accumulator chamber to said fluid pressure operating means.

11. In a motor vehicle planetary transmission having a plurality of brake operated speed ratio planetary gear sets, means including an adjustable selector operating rack shaft adapted to selectively operate said brakes, fluid pressure operating means for operating said rack shaft, a pump delivering fluid under pressure to said fluid pressure operating means, manually controlled means for selectively adjusting said rack shaft and for controlling operation thereof by said fluid pressure operating means, and means operating in response to said manually controlled means for supplementing the delivery of fluid under pressure to said fluid pressure operating means, said manually controlled means including a valve operating to control the supply of fluid under pressure from said pump and supplemental delivery means to said fluid pressure operating means.

12. In a motor vehicle planetary transmission having a plurality of brake operated speed ratio planetary gear sets, means including an adjustable selector operating rack shaft adapted to selectively operate said brakes, fluid pressure operating means for operating said rack shaft, a pump delivering fluid under pressure to said fluid pressure operating means, manually controlled means for selectively adjusting said rack shaft and for controlling operation thereof by said fluid pressure operating means, an accumulator chamber communicating with the pump delivery and with said fluid pressure operating means, a piston operating in said chamber and a spring acting on said piston for supplementing the delivery of fluid under pressure from said accumulator chamber to said fluid pressure operating means, said manually controlled means including a valve operating to control the supply of fluid under pressure from said pump and accumulator chamber to said fluid pressure operating means.

HERBERT F. PATTERSON.